Patented Feb. 8, 1944

2,341,398

UNITED STATES PATENT OFFICE 2,341,398

ADHESIVE COMPOSITION

Corneille O. Strother and Carl W. Patton, Pittsburgh, Pa., assignors to Carbide and Carbon Chemicals Corporation, a corporation of New York No Drawing. Application March 31, 1939, Serial No. 265,139

8 Claims. (Cl. 260—87)

This invention is directed to improved adhesive compositions comprising certain derivatives of polymerized vinyl esters of aliphatic acids and it includes a process for making such compositions.

Adhesive compositions comprising polymerized vinyl esters of aliphatic acids are well known, and they usually take the form of viscous solutions of the polymerized vinyl ester in a volatile solvent. The term "solution" is applied to these compositions in accordance with conventional terminology. These compositions may be used by bringing the surfaces to be joined into contact with the fluid solution and permitting a bond between the surfaces to be created during evaporation of the solvent. Alternatively, they may be used by first coating the surfaces with the adhesive composition and, after allowing the coating to dry, joining the surfaces firmly together through the application of heat and pressure.

The latter procedure is effective because of the thermoplastic nature of the polymerized vinyl esters. It has now been found that, by proper treatment, the adhesive qualities of such compositions can be greatly improved. This treatment comprises subjecting the polymerized vinyl ester to a controlled alcoholysis wherein a critical number of ester radicals from the polymerized vinyl ester are replaced by hydroxyl groups.

The first step in carrying out this alcoholysis reaction is the preparation of a solution of the polymerized vinyl ester in a solvent which is free from reactive hydroxyl groups. Examples of suitable solvents which may be used for this purpose are ketones, such as acetone, methyl ethyl ketone, and methyl isobutyl ketone; hydrocarbons such as benzene, toluene, and xylene; and certain cyclic ethers, such as 1-4 dioxane. It has been found that this latter solvent is especially useful as a dispersing medium for carrying out the alcoholysis, being substantially unaffected during the reaction.

The polyvinyl ester, in solution, is then reacted under substantially anhydrous conditions with a lower aliphatic alcohol in the presence of a suitable catalyst, preferably a mineral acid. The reaction is carried out under controlled conditions so that, in the final, partially alcoholized product, about 10% to about 51% of the ester groups in the polymerized vinyl ester have been replaced by hydroxyl groups. At the end of the reaction, the mineral acid catalyst—if such a catalyst is used—is neutralized by suitable means. If a hydrogen halide is used as the mineral acid catalyst, it is preferable to use an alkylene oxide as a neutralizing means since the alkylene halohydrin formed as a neutralization product is volatile and can readily be removed from the reaction products, leaving no substantial part of the highly corrosive mineral acid catalyst in the adhesive composition.

The final product will consist of the partially alcoholized polyvinyl ester dispersed in the solvent to form a viscous solution. The adhesive qualities of this product, when alcoholized within the range specified above, are truly remarkable. For example, a polyvinyl ester such as polyvinyl acetate will bind sheets of metal together with only moderate adhesive force since the sheets may readily be separated by hand, whereas the same sheets joined under similar conditions by the adhesive compositions of this invention can be separated only by using a hammer and chisel. We have found the degree of alcoholysis of the partially alcoholized polyvinyl ester to be critical with respect to the adhesive strength of the product. Outside the range of partially alcoholized products in which from about 10% to about 51% of the ester groups in the macromolecule have been replaced by hydroxyl groups there exists a distinct decline in the adhesive strength of the product. In addition, partially alcoholized products, in which more than about 51% of the ester groups of the macromolecule have been replaced by hydroxyl groups, show a marked reduction in solubility in the common organic solvents and also show a considerable tendency to absorb moisture and even, if the alcoholysis is carried far enough, to dissolve in water. All of these qualities are undesirable in the adhesive composition contemplated by the invention. Moreover, it has also been found that, by a replacement of about 14% to about 35% of the ester groups in the polyvinyl ester by hydroxyl groups, partially alcoholized products are obtained having optimum properties from the standpoint of adhesive strength, solubility in organic solvents, and resistance to water absorbtion.

The remarkable improvement in adhesive strength shown by the partially alcoholized products of this invention, as compared with unalcoholized polyvinyl esters, has been convincingly demonstrated by comparative tests. Two sets of steel panels were laminated together by first applying a solution of the adhesive substance to the panels, allowing the applied coating to dry, and pressing the coated panels together with a pressure of 2000 pounds per square inch at a temperature of 120° C. The areas in contact were approximately four square inches in each case. In one instance, polyvinyl acetate was used as an adhesive, and, in the other, as equal amount of a partially alcoholized product of this invention in which the optimum number of acetate groups of the polyvinyl acetate were replaced by hydroxyl groups. A force of 2600 pounds was sufficient to separate the panels laminated with polyvinyl acetate, when the panels were pulled apart by force applied parallel to their longitudinal axis, whereas, the panels joined with the adhesive substance of this invention were ruptured at a force of 3500 pounds without the lamination being broken, the steel panels themselves failing.

This experiment was repeated using stronger panels made of $\frac{3}{16}$ inch steel plate, 1½ inches by 5 inches in dimension. One end of each panel was cut away to a depth of $\frac{3}{32}$ inch and for a distance of 1½ inches. Two sets of these panels were laminated together by the application of heat and pressure, the indented areas being in contact, using polyvinyl acetate in one case and partially alcoholized polyvinyl acetate in the other. The completed test specimen formed a strip 1½ inches by 8½ inches by $\frac{3}{16}$ inch in which the laminated area in contact was 2.25 square inches. The test specimens were stressed so that the force was applied along the longitudinal axis of the lamination. The force required to separate the panels laminated with polyvinyl acetate was 1900 pounds, whereas the force required to separate the panels laminated with the adhesive substance of this invention was 4040 pounds.

The alcoholysis reaction now proposed for the production of the partially alcoholized polyvinyl esters differs distinctly from those suggested heretofore in that it has been found highly desirable to carry out the alcoholysis in the absence of water. It has been observed that the presence of water exerts a detrimental effect both on the rate of alcoholysis and on the quality of the product in the alcoholysis reaction of this invention. However, it is possible to prepare partially alcoholized polyvinyl esters alcoholized within the ranges contemplated by this invention by other known, but in general less satisfactory, methods.

To demonstrate the detrimental effect of water on the reaction, 2 parts by weight of a concentrated aqueous solution of hydrochloric acid were added to 100 parts of a solution consisting of 70 parts of acetone and 30 parts of polyvinyl acetate of grade 15. Grade 15 designates the viscosity in centipoises at 20° C. of a molar solution (86 grams per liter) of the resin in benzene. After refluxing this solution for a short time, it turned brown and rapidly became much darker. Another solution of the same composition discolored at room temperature and, after a few days, had set to a black, gel-like composition.

In distinct contrast, as an example of the superior results obtained in the absence of water, 25 c. c. of a solution of 11 mols of hydrogen chloride per liter of dry methanol were added to 400 grams of a 30% solution by weight of polyvinyl acetate, grade 15, in acetone. The reaction was carried out under vigorous stirring for three and one-half hours at room temperature. The catalyst acid was then neutralized with propylene oxide. The color of the solution was a light brown, and this color may have been due to condensation products of acetone. When the product was used as an adhesive to join steel sheets, the adhesion secured was much superior to that obtained with the original polyvinyl acetate. In the final product, approximately 30% of the original acetate groups in the polyvinyl acetate were replaced by hydroxyl groups.

For further demonstration of the deleterious effect of water in the reaction, 2 parts by weight of aqueous concentrated hydrochloric acid were added to two solutions made up of 20 parts of polyvinyl acetate, grade 15, in 80 parts of toluene and monochlorbenzene, respectively. Upon standing for a few hours at room temperature, precipitates, black to purple in color, were found in both solutions.

For further contrast, as an example of the superior results obtained in the absence of water, 25 c. c. of a solution of 11 mols of hydrogen chloride per liter of dry methanol were added to a solution consisting of 120 grams of polyvinyl acetate, grade 15, dissolved in 280 grams of toluene. The mixture thus formed was cloudy, indicating incomplete miscibility. The reaction was carried out under vigorous stirring at room temperature between 25° and 30° C. After three and one-half hours, substantially all the alcohol had reacted and the solution was clear and viscous. The solution was then neutralized by adding an equivalent amount of an alkylene oxide, such as ethylene, propylene, or butylene oxide, and forming a volatile chlorhydrin. This neutralization product is volatile and will evaporate when the adhesive composition is applied, thus providing very effective removal of the corrosive acid catalyst from the composition. Less desirably other neutralizing agents, such as organic or inorganic bases, can be used. In the final product, approximately 30% of the original acetate groups in the polyvinyl acetate were replaced by hydroxyl groups.

It will be observed that carrying out the alcoholysis in the absence of water when a mineral acid catalyst is used results in marked advantages, among which are a vastly improved color, in the final product, the avoidance of precipitates and gels, and a much greater rate of reaction. The reason why a greater rate of reaction is obtained when the reaction is carried out in the absence of water is believed to be this. The concentrated alcoholic solution of mineral acid, such as hydrogen chloride, are often immiscible with the solvents used to dissolve the polyvinyl ester. The reactants are therefore agitated and the reaction carried out in two phases with the hydrogen chloride being distributed between the phases. The presence of water in the system is believed to cause the hydrogen chloride to concentrate more in the alcohol phase than in the organic solvent phase, which is usually hydrophobic, with a consequent decrease in the rate of reaction.

It has been found, moreover, that the alcoholysis reaction may be carried out in the presence of certain catalysts other than mineral acids. For example, it has been found that sodium ethylate or a suspension of zinc oxide is useful as a catalyst. In this latter case, it is difficult to remove the suspended catalyst from the final viscous solution, but such removal of the catalyst is not essential for the use of the composition as an adhesive.

The adhesive compositions of this invention may be applied in a variety of methods and for a variety of applications. They are valuable in the lamination of metal sheets where they are preferably applied by first coating the surfaces of the sheets to be joined with the adhesive composition, and thereafter drying the sheets. The coated sheets are then joined by subjecting them to heat and pressure. Temperatures of from 50° C. to 200° C., and pressures of from 50 to 5000 pounds per square inch have proved suitable for such applications. Metal sheets joined in this manner adhere exceptionally well, even under impact, whereas the same sheets joined by the unalcoholized polyvinyl ester tend to separate completely when struck a sharp blow.

Other applications of the adhesive composition include the sealing of aluminum foil to cork; of aluminum foil to paper; of cork to tin plate; and for joining to paper sheets of cellulose acetate, cellulose nitrate, or regenerated cellulose. In such uses it is preferred first to coat the surfaces of the sheets of material to be joined with the adhesive composition in solid form, as by applying the viscous solution resulting from the alcoholysis reaction directly and allowing it to dry; or, alternatively, the partially alcoholized polyvinyl ester may be separated in solid form and applied to the materials by calendering, by roll coating, or by other suitable means. The surfaces of the coated sheets to be joined are softened by a brief exposure to heat, and the sheets are then joined by a brief application of moderate pressure. In those applications where the sheets being joined are flexible or thin, the coated sheets are generally stored in rolls or stacks prior to the joining operation. In such storage, sheets coated with the usual polyvinyl ester resins tend to adhere or block because of the low softening temperature and susceptibility to cold flow of these resins. Sheets coated with the adhesive compositions of this invention show less tendency to adhere in this manner during storage.

In addition to the materials mentioned above, the adhesive substances of this invention exhibit excellent adhesion to almost all materials, including non-fibrous materials such as copper, tin, aluminum, steel, glass, earthenware or porcelain, as well as to the fibrous or plastic materials. In addition to the methods of application mentioned above, the adhesive compositions may also be applied as a glue in which they are applied to surfaces as a thick viscous solution and a bond between the surfaces is created during evaporation of the solvent.

Modifications of the invention other than as described above will readily be apparent to those versed in the art. For instance, other polyvinyl esters of lower aliphatic acids such as polyvinyl formate, polyvinyl propionate, polyvinyl butyrate, and the like, are suitable in the practice of the invention. The macromolecular weight of these polymerized vinyl esters, as determined by their grade, may also be widely varied. Other methods of applying these partially alcoholized polyvinyl esters as adhesives, other than as outlined above, will also be obvious. Plasticizers and other modifying agents may also be included in the adhesive composition. All such modifications are included within the scope of the invention as defined by the appended claims.

We claim:

1. Process for making an adhesive substance which comprises forming a solution of polyvinyl acetate in a solvent containing no free hydroxyl groups, reacting under substantially anhydrous conditions said polyvinyl acetate with an aliphatic alcohol in the presence of hydrogen chloride as a catalyst, neutralizing the hydrogen chloride with an alkylene oxide, and obtaining a water-insoluble, colorless to light colored product in which the ester groups in the polyvinyl acetate have been partially replaced by alcoholic hydroxyl groups.

2. Process for making an adhesive substance which comprises forming a solution of polyvinyl acetate in toluene, reacting said polyvinyl acetate under substantially anhydrous conditions with methanol in the presence of hydrogen chloride as a catalyst, neutralizing the hydrogen chloride with propylene oxide, and obtaining a water-insoluble product in which from about 14% to about 35% of the ester groups in the polyvinyl acetate have been replaced by hydrodroxyl groups.

3. A laminated product comprising a plurality of sheets bonded together with an adhesive substance comprising a partially alcoholized, water-insoluble, polymerized vinyl ester of a lower aliphatic acid in which from about 10% to about 30% of the ester groups in the polymer have been replaced by hydroxyl groups.

4. A laminated product comprising a plurality of metal sheets bonded together with an adhesive substance comprising a partially alcoholized, water-insoluble, polymerized vinyl ester of acetic acid in which from about 14% to about 30% of the ester groups in the polymer have been replaced by hydroxyl groups.

5. A fabricated product comprising a plurality of metal parts bonded together with an adhesive substance comprising a partially alcoholized, water-insoluble, polymerized vinyl ester of a lower aliphatic acid in which from about 10% to about 30% of the ester groups in the polymer have been replaced by hydroxyl groups.

6. A fabricated product comprising a plurality of metal parts bonded together with an adhesive substance comprising a partially alcoholized, water-insoluble, polymerized vinyl ester of acetic acid in which from about 14% to about 30% of the ester groups in the polymer have been replaced by hydroxyl groups, said adhesively united parts being characterized by strong adhesion to each other under stress.

7. Process for joining articles which comprises forming between adjacent surfaces of said articles a thin layer of an adhesive composition comprising a partially alcoholized, water-insoluble, polymerized vinyl ester of a lower aliphatic acid in which from about 10% to about 30% of the ester groups in the polymer have been replaced by hydroxyl groups and subjecting the assembly to heat and pressure.

8. Process for joining articles which comprises forming between adjacent surfaces of said articles a thin layer of an adhesive composition comprising a partially alcoholized, water-insoluble, polymerized vinyl ester of acetic acid in which from about 14% to about 30% of the ester groups in the polymer have been replaced by hydroxyl groups and subjecting the assembly to heat and pressure.

CORNEILLE O. STROTHER.
CARL W. PATTON.

CERTIFICATE OF CORRECTION.

Patent No. 2,341,398. February 8, 1944.

CORNEILLE O. STROTHER, ET AL.

It is hereby certified that error appears in the printed specification of the above numbered patent requiring correction as follows: Page 2, first column, line 1, for "as equal" read --an equal--; page 3, second column, line 17, claim 2, for "hydrodroxyl" read --hydroxyl--; and that the said Letters Patent should be read with this correction therein that the same may conform to the record of the case in the Patent Office.

Signed and sealed this 28th day of March, A. D. 1944.

Leslie Frazer (Seal) Acting Commissioner of Patents.